United States Patent [19]

Ensink

[11] 4,067,264
[45] Jan. 10, 1978

[54] LOCOMOTIVE CAB RUNNING BOARDS

[75] Inventor: Tom Ensink, Velsen-Zuid, Netherlands

[73] Assignee: Hoogovens Ijmuiden B.V., Ijmuiden, Netherlands

[21] Appl. No.: 649,318

[22] Filed: Jan. 15, 1976

[30] Foreign Application Priority Data

Jan. 30, 1975 Netherlands .......................... 7501080

[51] Int. Cl.² .................... B61C 5/00; B61C 17/04; B61D 49/00; B61J 3/00
[52] U.S. Cl. ................... 105/456; 105/62 R; 105/457; 105/460; 246/187 B
[58] Field of Search ............... 105/41, 61, 77, 456, 105/48, 457, 458, 459, 460; 246/187 B

[56] References Cited

U.S. PATENT DOCUMENTS

| 87,098 | 2/1869 | Goodwin | 105/456 |
|---|---|---|---|
| 1,220,720 | 3/1917 | Blashfield | 105/457 |
| 1,917,314 | 7/1933 | Moir | 105/367 |
| 1,986,042 | 1/1935 | Burkhardt | 105/456 |
| 3,307,058 | 2/1967 | Kucera | 105/77 X |
| 3,937,432 | 2/1976 | Birkin | 246/187 B |

*Primary Examiner*—Robert J. Spar
*Assistant Examiner*—Howard Beltran
*Attorney, Agent, or Firm*—Stevens, Davis, Miller & Mosher

[57] ABSTRACT

A rail-borne shunting locomotive, to be operated through radio control by a driver as he moves around the locomotive, has a central power plant compartment, a cabin at each end adjacent the power plant compartment, gangways on each side extending alongside the power plant compartment from one cabin to the other, an open platform at each end in front of the cabin and at each side of the platform, at least one step for the driver to stand on at a lower level than the platform. Each cabin is directly accessible from both gangways and from the respective platform. A wide range of operating locations is available to the driver and access to them is convenient.

3 Claims, 4 Drawing Figures

LOCOMOTIVE CAB RUNNING BOARDS

BACKGROUND OF THE INVENTION

1. FIELD OF THE INVENTION

This invention relates to railborne locomotives, especially shunting locomotives, which are adapted for radio control by a driver who is usually in a standing or sitting position on the locomotive and who carries a radio transmitter through which he controls the locomotive. He is thus free to move in order to adopt the most suitable location for the particular task in hand. In the operation of a shunting locomotive, a variety of different tasks are performed and different locations on the locomotive are most suitable for different tasks.

2. DESCRIPTION OF THE PRIOR ART

Locomotives adapted for remote control by radio are known. They are merely normal shunting locomotives having a control cabin somewhere in the middle of the locomotive or at one end, with the additional facility that the controls are arranged to be operated remotely by radio. Particularly with one-man operation, a number of ergonomical disadvantages of these locomotives can be demonstrated, and these disadvantages are increased since the driver has to carry at least the radio transmitter, which may weigh 4 to 5 Kg (9 to 10½ lbs.).

SUMMARY OF THE INVENTION

It is an object of the invention to provide a remotely controllable locomotive, which need not have a conventional control cabin, but is operable entirely by means of radio remote control, there being provided shelter cabins for the operator at ergonomically desirable locations.

It is another object of the invention to provide a shunting locomotive adapted for radio control which is capable of convenient, safe and efficient operation.

It is yet another object of the invention to provide a shunting locomotive adapted for radio control, which permits the driver to be at or near the front end when the locomotive is pulling a train and at or near the first wagon (freight car) when the locomotive is pushing. To this end, it is another object to enable the driver to select his location at either end of the locomotive so that his forward and sideways vision is most favourable.

It is another object to provide a locomotive adapted for remote control in which movement of the operator is minimized and is rendered easy, e.g. with a minimum of climbing.

These and other objects of the invention are obtainable with a shunting locomotive according to the invention, which is adapted for radio control and has at each end on each side, at least one step suitable to be stood upon by a driver when operating the locomotive by radio control. At each end there is an open platform permitting walking movement of the driver from the said step or steps on one side to the step or steps on the other side. The step or steps are lower than the platform. The locomotive has at each end but more inwardly from the end than said open platform, a shelter cabin for the driver, and between the said two shelter cabins a power plant compartment, which may be subdivided if desired.

At each side of the locomotive a gangway extends alongside the power plant compartment from one shelter cabin to the other. Each cabin is directly accessible to the driver from the said open platform at the same end of the locomotive and from both the gangways.

With this arrangement, the driver, with his equipment, can move freely easily and safely around the locomotive and has a very wide range of positions which he can adopt in dependence on for instance the operation being performed, the requirements of good vision and the weather conditions.

The step or steps at either side at each end should be spacious enough to be conveniently stood upon with safety. They may take the form of small platforms. Suitably two or three such steps are provided on each side at each end.

It is ergonomically advantageous that the said open platforms, the gangways and the floors of the shelter cabins are at a common level, which desirably should be as low (close to the rail level) as is permitted by the construction of the locomotive.

BRIEF DESCRIPTION OF THE DRAWINGS

A preferred embodiment of the invention will now be described by way of nonlimitative example with reference to the accompanying drawings, in which.

DESCRIPTION OF THE PREFERRED EMBODIMENT

Figure 3:
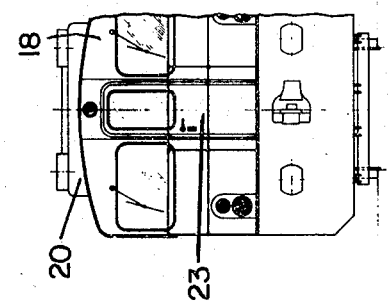
FIG. 3 is a front elevation of the locomotive of FIG. 1.

The following description of the illustrated embodiment is confined to those aspects of the locomotive with which the invention is particularly concerned. Full description of many parts and arrangements, for instance details of the radio control, the power plant, the cooling circuit or the brakes and wheels, is not necessary since in general their design and construction may be of conventional type and will cause no problem to an expert.

The rail-borne shunting locomotive shown in the accompanying figures rests on the rails 13 by means of wheels mounted in two bogies 11 and 12. The locomotive has a supporting deck 14 that forms the walking level for the operator. At the front and back ends of the locomotive the supporting deck 14 forms open platforms 15 on either side of each of which are three spacious and safe steps 16 forming platforms suitable for the operator to stand upon. Instead of the usual control cabin in the centre or at one end of the locomotive, shelter cabins 17 and 18 are provided at the front and at the back ends. These shelter cabins each contain one or more seats 19 in this case two seats, and are provided with heating or air conditioning, screen wipers, spotlights on their front walls, and auxiliary control and inspection apparatus. They serve to provide a shelter for the operator in unfavourable weather conditions and to offer a seat to the operator on longer runs.

The power plant or engine is located between the two shelter cabins 17 and 18. On either side of the engine compartment 20 there is a gangway 21 provided with a handrail 22. The cabin floors, the open platforms 15 and the gangways are all at the same height above rail level. Between each open platform 15 and the adjacent shelter cabin 17 or 18 there is a door 23, while between each cabin 17 or 18 and the adjacent end of each of the gangways 21 there is an outwardly swinging door 24.

Figure 4:
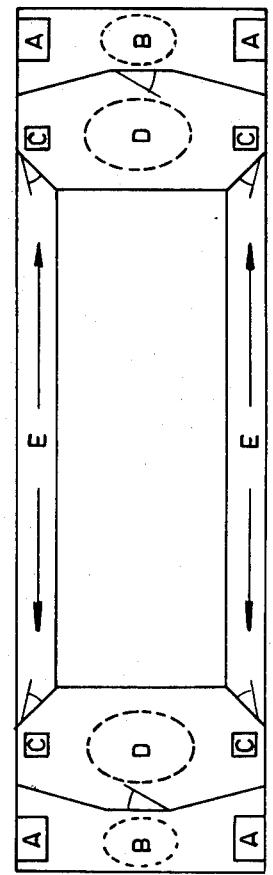
FIG. 4 is a diagrammatical top plan view of the locomotive of FIG. 1 illustrating various possible locations for the driver.

In this way the new construction embodying the invention provides a safe arrangement because the front door and two side doors from each cabin can serve as ways of escape for the operator. In the locomotive of the invention the operator has a number of freely available choices for his standing or sitting positions so that climbing and walking is minimized. This is explained with reference to FIG. 4. During runs of the locomotive over short distances from one hand-signalled point to another with a train which is pulled, for instance, one of the standing locations A on the steps 16 can be adopted. On these step platforms, the man is standing within the profile of the locomotive on a level close to the ground. In this situation it is important that the man has an unobstructed view both sideways over the open platform 15 and forwards along the shelter cabin onto the adjacent rails. During runs over longer distances with a train which is pulled and in favourable weather conditions the man can stand on a higher level on the open platform 15 which is guarded by a hand rail adopting a location such as B so that his forward and sideways view is as favourable as possible.

In view of the need for frequent stepping up and stepping down by the operator, the height of the platforms 15 should however not be higher than is necessary for the construction of the locomotive. During runs over distances when it is profitable to sit down, for example under unfavourable weather conditions, the man can in the case of a train which is pulled use one of the two seats at C or a temporary seat at an arbitrary location D in one of the two shelter cabins.

The distribution of glass in walls and and doors of the shelter cabins is such that maximum vision is obtained, even at an angle backwards. When driving the locomotive without a train the man can move upon reversal of the driving direction from one end to the other by means of the hand-rail guarded open gangways, as indicated by E.

Figure 1:
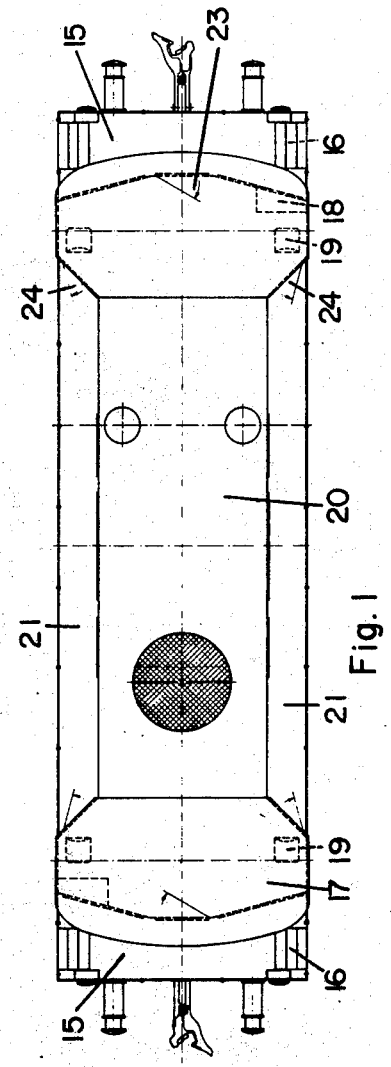
FIG. 1 is a top plan view of a shunting locomotive embodying the invention.
Figure 2:
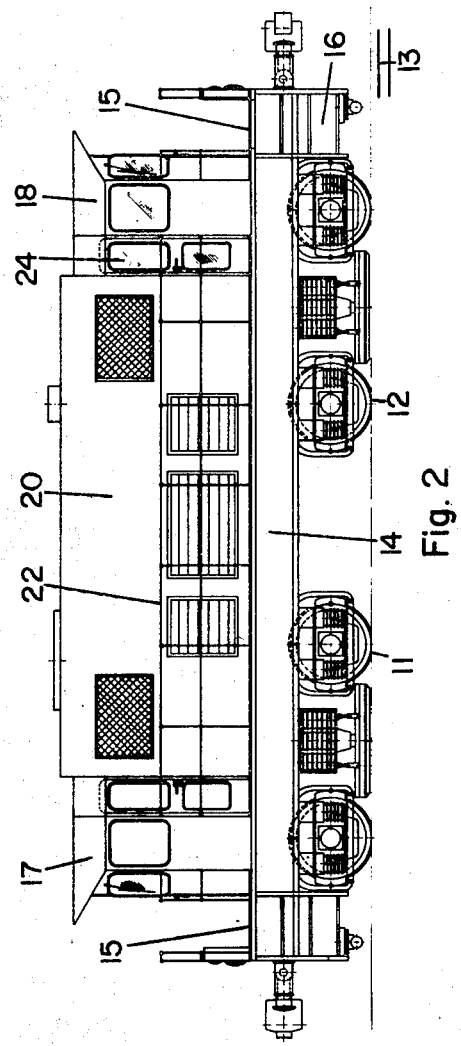
FIG. 2 is a side elevation of the locomotive of FIG. 1.

The motor compartment 20 (see FIGS. 1 to 3) can, without causing difficulties in vision, be built so that its roof is higher than the roof of the shelter cabins 17, 18 and may even reach the maximum permitted height within the loading gauge.

In shunting yards with many curved tracks of small radius, it is important that the locomotive is as short as possible, in order to restrict wear on wheels and rails as much as possible and also to make coupling and uncoupling of the locomotive and wagons as easy as possible. This latter point is very important in the case of one-man operation. In a short locomotive the extra space that is created by use of a high motor compartment is important. A high central motor compartment makes it possible in the illustrated locomotive to arrange much larger exhaust mufflers to reduce the sound level. This is reduced further by the use of double sound insulation around the engine, while the cooling circuit of the engine is of such a large capacity that during a certain period (5 to 10 minutes) the slowly running cooling ventilator may be stopped totally without harm while driving over short stretches through for example residential areas where very severe requirements as to sound level are in force. By means of movable blinds the entire motor compartment may be closed.

Also special cast spoke rail wheels are employed instead of rolled or pressed wheels to reduce noise emanation during driving. These special wheels are moreover so constructed that heat removal during frequent braking is improved. The locomotive is equipped with block brakes instead of disc brakes to reduce the risk of "flats" on the treads and so to contribute in this way in the attempt to avoid excess noise. Preferably the locomotive is equipped with additional electromagnetic brakes that brake directly onto the rail. For the control of dynamic braking (e.g. regenerative braking), block brakes and magnetic brakes, a self regulating system is provided.

The illustrated locomotive may be heavy e.g. of 90–100 tons, and is designed in particular for industrial applications, where high continuous tractive power, low speed (e.g. 28 km/h max.), large braking capacity and low sound level combined with wireless remote control and one-man operation are important. The drive can suitably be diesel-hydraulic or diesel-electric. With a short locomotive preferably high speed diesel-engines are used. If a greater length is not objectionable, a slow running diesel engine may be used.

While the invention has been illustrated above by reference to one preferred embodiment it will be understood by those skilled in the art that various changes may be made without departing from the spirit and scope of the invention and it is intended to cover all such changes and modifications by the appended claims.

What is claimed is:

1. A rail-borne shunting locomotive which is adapted for radio control having,
    a supporting deck with two opposite ends and two opposite sides, at least one step at each end on each side,
    at each end of said deck is an open platform permitting walking movement of the driver from one said step to the other said step, which steps are at a lower level than the platform,
    at each end of said deck is spaced inwardly from the end than said open platform, a shelter cabin for the driver, extending between the opposite sides of the deck while between the said two shelter cabins is a power plant compartment, and
    at each side of the deck is a gangway extending alongside the power plant compartment from one said cabin to the other said cabin, each said cabin having doorways that are directly accessible to the driver from the respective open platform and from each of the said gangways, to enable movement between said open platforms, gangways and floors of said cabins which are all on the same level.

2. A locomotive according to claim 1 wherein each said cabin is provided with at least one seat, a window having a window wiper, and a headlight.

3. A locomotive according to claim 1 wherein the power plant compartment has a roof which is higher above rail level than roofs of the cabins.

* * * * *